Patented Oct. 15, 1940

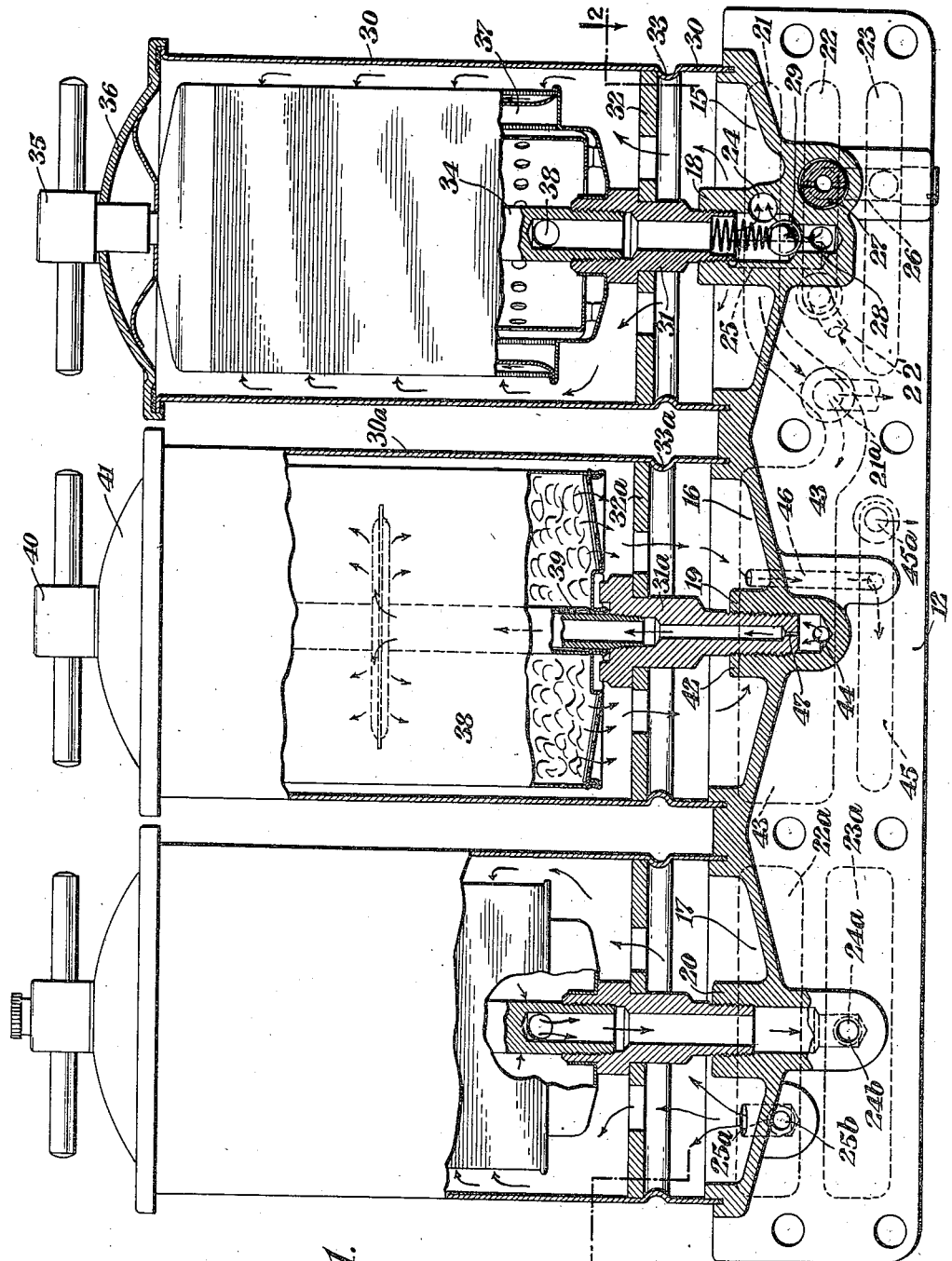

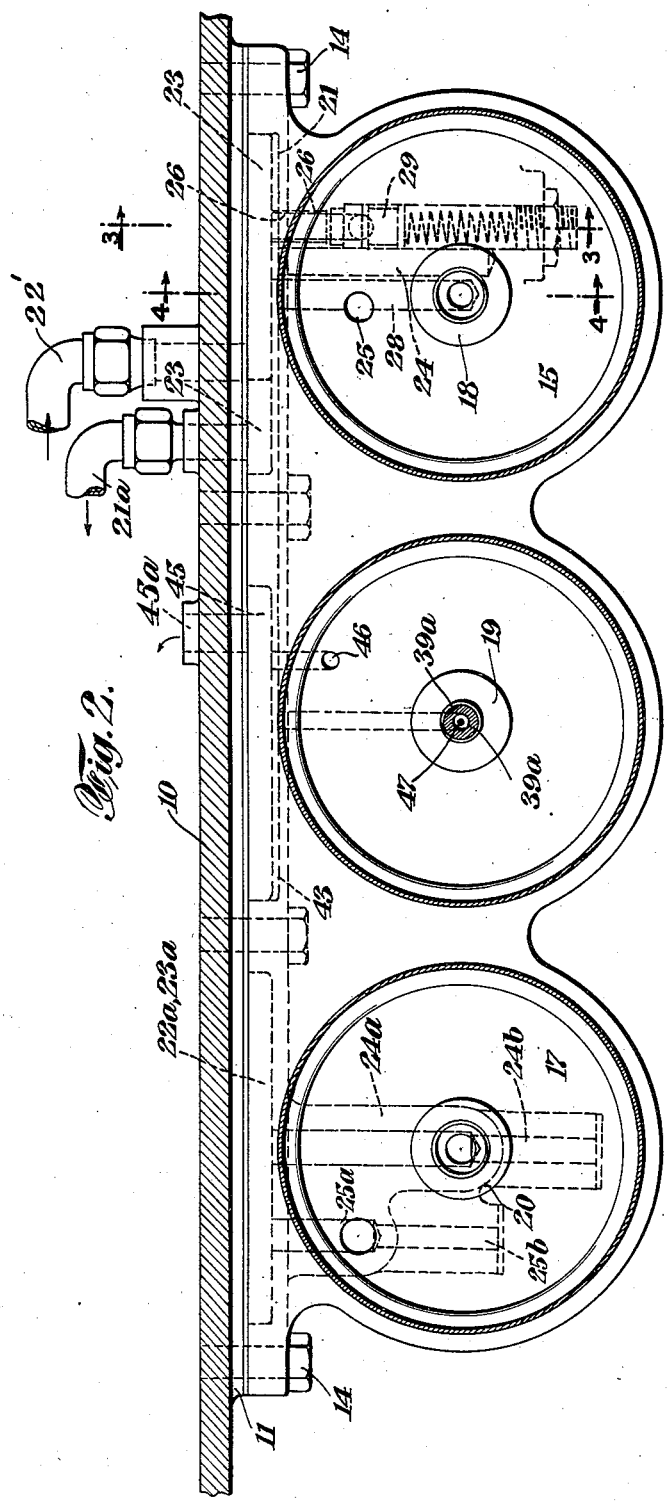

2,218,226

UNITED STATES PATENT OFFICE 2,218,226

FILTER

Lewis W. Williams, Short Hills, N. J., assignor to Motor Improvements, Inc., Newark, N. J., a corporation of Delaware Application May 14, 1938, Serial No. 207,881

2 Claims. (Cl. 210—165)

This invention relates to filters and more especially to filters for use in connection with the lubrication and fuel systems of internal combustion engines such, for example, as Diesel engines.

There are two different classifications of impurities usually present in the lubricant of an internal combustion engine, one of which may be defined as abrasive particles of such size as to be injurious to the working parts of the engine if not removed from the lubricant and the other of which may be defined as solid particles of such minute size as not to be injurious to the working parts of the engine and to effect the color of the lubricant rather than its lubricating quality. It is important that all impurities of the first classification be removed from lubricant supplied to the bearings for protection thereof and it is desirable that the impurities of the second classification be removed to improve the general character and appearance of the lubricant.

According to this invention, oil drawn from the engine crankcase is supplied to a filter capable of removing impurities of the first classification from oil passing through it at a relatively high rate and the oil discharged from such filter is supplied in part to the bearings and in part to a filter capable of removing the impurities of the second classification, the discharge from the second filter being returned to the crankcase. With this arrangement, the lubricant is freed of all impurities so that the bearings are fully protected against injury from abrasive particles in the lubricant and the oil is maintained bright and clear because of the removal of the color-producing impurities of the second classification. Preferably, the two filters are provided with a common base directly attachable to the crankcase wall and having slots in alinement with passageways formed in the crankcase wall for passing oil from the crankcase through the first filter to the bearings and passageways for leading oil from the outlet of the first filter to the inlet of the second filter and a further passageway in alinement with a passageway in the crankcase wall for returning oil from the outlet of the second filter to the crankcase. Oil is supplied from the outlet of the first filter directly to the inlet of the second filter through a passageway of minimum length. A filtering unit satisfactory for removing impurities of the first classification as a metal ribbon type filter such as is illustrated in United States Letters Patent No. 2,042,537 to Robert P. F. Liddell and a filtering unit satisfactory for removing impurities of the second classification is the absorption type filter illustrated in the Patent to Layte, et al. Patent No. 2,158,512. Each filtering unit is enclosed in a casing which is detachably associated with the base to form a container for the filtering unit. On the same base is arranged a fuel filter consisting of any suitable type of filtering unit enclosed by a casing detachably associated with the base. The base is provided with inlet and outlet passageways for directing fuel through the filtering unit and the crankcase wall is provided with passageways in alinement therewith for facilitating the flow of fuel to and from the filter.

The features of novelty of the present invention will be apparent from the following specification and accompanying drawings, wherein:

Fig. 1 is an elevation partially in section of a combined lubricant and filtering system embodying the invention;

Fig. 2 is a section substantially on the line 2—2 of Fig. 1;

Fig. 3 is a section on the line 3—3 of Fig. 2, and

Fig. 4 is a section on the line 4—4 of Fig. 2;

In the drawings, 10 designates the wall of a crankcase of an internal combustion engine and 11 designates a pad provided on such wall. A cast metal base 12 has a flat-face flange 13 engaging the pad 11 and is attached thereto by bolts 14 passing through holes provided in the flange for that purpose. The base is provided with a plurality of sumps 15, 16 and 17 in each of which is provided a hollow boss 18, 19 and 20 respectively. In the flange 13 are provided a plurality of slots 21, 22 and 23 of which 21 communicates through the passageway 24 with the boss 18, 22 communicates through the passageway 25 with the sump 15 and 23 communicates with the slot 22 through a passageway 26 provided with a pressure regulating valve 27. Between the slot 22 and the boss 18 is a by-pass 28 controlled by a spring-pressed check valve 29. The crankcase wall is provided with an aperture communicating with a pipe 22′ for supplying oil to the slot 22 and an aperture communicating with the pipe 21a for leading oil from the slot 21 to the bearings. Also, the crankcase wall is provided with an aperture (not shown) communicating with the slot 23 for leading oil therefrom to the crankcase.

A cylinder 30 fits into a groove in the base and is detachably associated with the base through the medium of a hollow stud 31 threaded into the boss 18 and engaging a perforated disk 32 which bears against an inwardly directed rib 33 in the casing 30. A post 34 is threaded into the stud 31 and to its upper end is threaded a nut 35 which clamps the cover 36 to the cylinder 30. Within the cylinder 30 is provided a metal ribbon filtering unit 37 of the type illustrated in Liddell Patent No. 2,042,537, the interior of the filtering unit communicating with the hollow bottom portion of the post 34 through the aperture 38.

Oil to be filtered is supplied to the slot 22 and through the passageway 25 is delivered into the interior of the casing around the filtering unit. Filtered oil is discharged from the interior of the filtering unit through the aperture 38, post 34, stud 31, post 18 to the slot 21. The check valve 29 permits oil to by-pass from the slot 22 to the slot 21 in the event that the filtering unit is clogged and the valve 27 regulates the oil pressure by permitting flow of oil from the slot 22 to the slot 23 in the event that the pressure exceeds a predetermined minimum.

A cylinder 30a is attached to the base through the intermediary of a hollow stud 31a which engages a perforated disk 32a resting upon an inwardly directed rib 33a of the cylinder 30a. A hollow post 39 has its lower end threaded into the stud 31a and to its upper end is threaded a nut 40 which clamps the cover 41 to the cylinder 30a. Surrounding the post is a filtering unit 38 of the absorption type disclosed in the Patent to Layte, et al. Patent No. 2,158,512 and is provided with a distributor by means of which oil is supplied to the interior of the unit. In the flange 13 is provided a slot 43 which communicates through the passageway 44 with the slot 21 and also communicates with the bottom of the boss 19. A slot 45 in the flange 13 communicates through the passageway 46 with the sump 16. The pad 11 is provided with a passageway 45a which communicates with the slot 45 for the purpose of returning oil therefrom to the crankcase. Oil is delivered from the slot 21 through the passageway 44 in slot 43 to the bottom of the boss 19 and then flows through the restricted orifice 47 in the bottom of the stud 31a into the stud and through the post 39 into the interior of the filtering unit 38. The filtered oil in the casing passes through the apertures in the disk 32a and is discharged through the passageway 46 and slot 45 into the crankcase.

A third filtering unit of the same structure as the first described filtering unit is supported by the base as previously described except that there is no by-pass passage and no pressure regulating valve. The flange 13 is provided with slots 22a and 23a which register with apertures in the crankcase wall and communicate respectively with the sump 17 and boss 20. The fuel to be filtered is supplied by means, not shown, to the crankcase wall passageway in alinement with the slot 22a and is discharged through means, not shown, communicating with the passageway in the crankcase wall registering with the slot 23a. Except as above pointed out, the third filtering unit is identical with the first filtering unit.

The structure above described provides a compact and unitary arrangement of filters in which the filters are neatly combined with no exterior piping and one in which the fuel oil is maintained at standard temperature. Such a unitary structure facilitates assembly of the filters with the engine and is very acceptable to engine manufacturers.

Under some circumstances it is desirable to provide the fuel oil filter with exterior piping. For such use, the fuel filter is provided with the inlet and outlet passages 24b and 25b. The set of inlet and outlet passages not used is suitably plugged.

I claim:

1. In combination with an engine crankcase wall having three apertures, a base having a flat faced flange for attachment to said wall in overlying relation to said apertures and provided with a pair of sumps, a hollow boss in each sump, a first and a second filtering unit communicating with said bosses, inlet and outlet passages in said base for said first filtering unit, inlet and outlet passages in said base for said second filtering unit, a slot in said flanged face communicating with one first unit passage, a second slot in said flanged face communicating with the remaining first unit passage and one second unit passage, and a third slot in said flanged face communicating with the remaining second unit passage, each of said slots being in register with one crankcase wall aperture.

2. In combination with an engine crankcase wall having three apertures, a base having a flat faced flange for attachment to said wall in overlying relation to said apertures and provided with a pair of sumps, a hollow boss in each sump, a first and a second filtering unit communicating with said bosses, a pair of slots in said flanged face communicating one with the first unit sump and the other with both the first unit boss and the second unit boss and a third slot in said flanged face communicating with the second unit sump, each of said slots being in register with one crankcase wall aperture.

LEWIS W. WILLIAMS.